(12) United States Patent
Itoh et al.

(10) Patent No.: US 12,731,492 B2
(45) Date of Patent: Sep. 8, 2026

(54) VEHICLE CONTROL DEVICE

(71) Applicant: DENSO CORPORATION, Kariya-city (JP)

(72) Inventors: Jun Itoh, Kariya-city (JP); Naotsugu Shimizu, Kariya-city (JP); Masato Onozawa, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 104 days.

(21) Appl. No.: 18/330,995

(22) Filed: Jun. 7, 2023

(65) Prior Publication Data

US 2023/0316926 A1 Oct. 5, 2023

Related U.S. Application Data

(63) Continuation of application No. PCT/JP2021/043616, filed on Nov. 29, 2021.

(30) Foreign Application Priority Data

Dec. 8, 2020 (JP) ................................ 2020-203415

(51) Int. Cl.

*G08G 1/16* (2006.01)
*B60W 40/04* (2006.01)
*G01S 13/931* (2020.01)

(52) U.S. Cl.

CPC ............ *G08G 1/167* (2013.01); *B60W 40/04* (2013.01); *G01S 13/931* (2013.01); *B60W 2552/00* (2020.02); *B60W 2554/80* (2020.02); *G01S 2013/9315* (2020.01); *G01S 2013/93272* (2020.01)

(58) Field of Classification Search

CPC ......... G08G 1/167; G08G 1/16; B60W 40/04; B60W 2552/00; B60W 2554/80; B60W 2420/408; G01S 13/931; G01S 2013/9315; G01S 2013/93272

See application file for complete search history.

(56) References Cited

U.S. PATENT DOCUMENTS 7,477,137 B2 * 1/2009 Matsumoto ............... B60R 1/12 340/435
9,834,216 B2 * 12/2017 Pawlicki ................. B60R 11/04
12,140,694 B2 * 11/2024 Sasaki .................. G01S 13/931

(Continued)

*Primary Examiner* — Peter D Nolan
*Assistant Examiner* — Demetra R Smith-Stewart
(74) *Attorney, Agent, or Firm* — Precision Patents, P.C.

(57) ABSTRACT

A vehicle control device assists in checking a rear side of an own vehicle. The vehicle control device includes a position estimation unit, an SN index calculation unit, a lane determination unit, and an alarm determination unit. The position estimation unit estimates a lateral position of an other vehicle based on a reflected wave of a radar wave. The SN index calculation unit calculates, based on the reflected wave, an SN index indicating a relationship between level of a noise and level of a signal. In response to determining a lane in which the other vehicle is traveling based on information on the lateral position of the other vehicle, the lane determination unit performs determination on the lane based on the SN index. The alarm determination unit determines whether a condition for issuing an alarm about the other vehicle is satisfied based on a result of determination of the lane.

14 Claims, 10 Drawing Sheets

(56) References Cited

U.S. PATENT DOCUMENTS

| | | | | |
|---|---|---|---|---|
| 2008/0204304 | A1* | 8/2008 | Yamaguchi | G01S 17/42 342/70 |
| 2020/0111368 | A1* | 4/2020 | Park | B60W 40/04 |
| 2020/0124713 | A1 | 4/2020 | Shimizu et al. | |
| 2023/0176190 | A1* | 6/2023 | Westerhoff | G01S 13/42 342/70 |

* cited by examiner

FIG.8

FIG.9
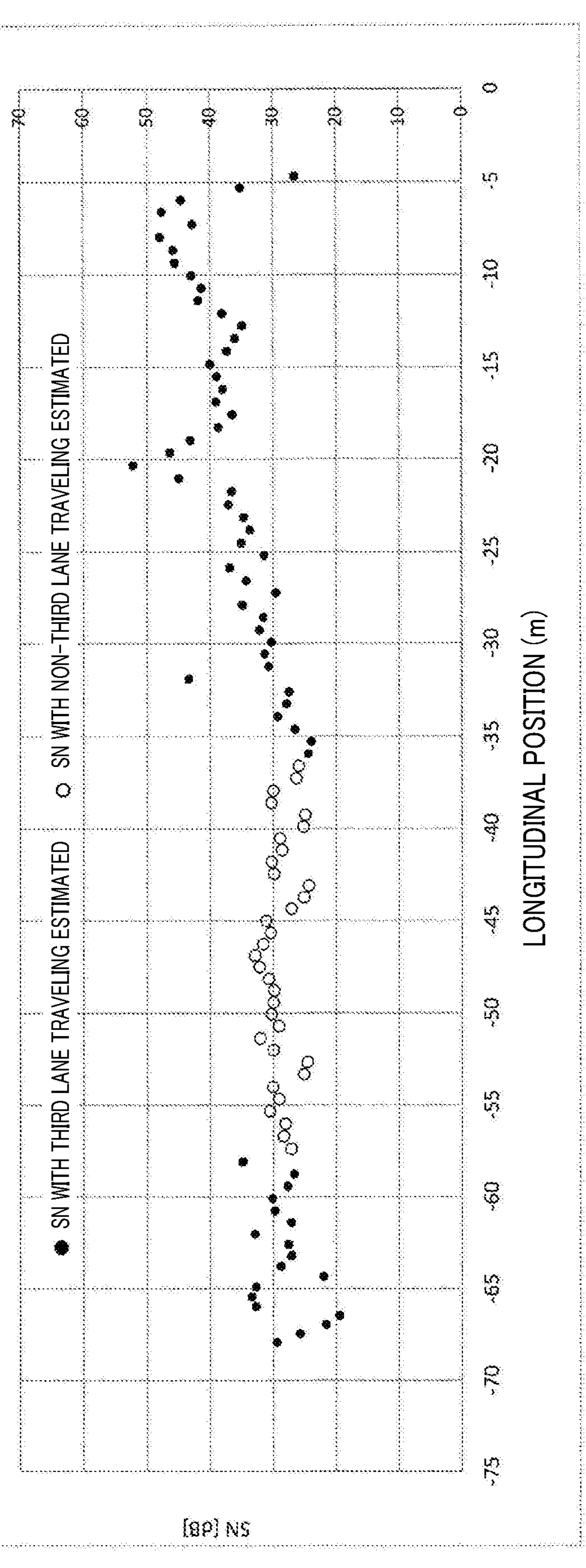
SN WITH THIRD LANE TRAVELING ESTIMATED
SN WITH NON-THIRD LANE TRAVELING ESTIMATED
SN [dB]
LONGITUDINAL POSITION (m)
70
60
50
40
30
20
10
0
0
-5
-10
-15
-20
-25
-30
-35
-40
-45
-50
-55
-60
-65
-70
-75

(TRAVELING ON OUTER SIDE OF SECOND LANE)

(TRAVELING ON INNER SIDE OF THIRD LANE)

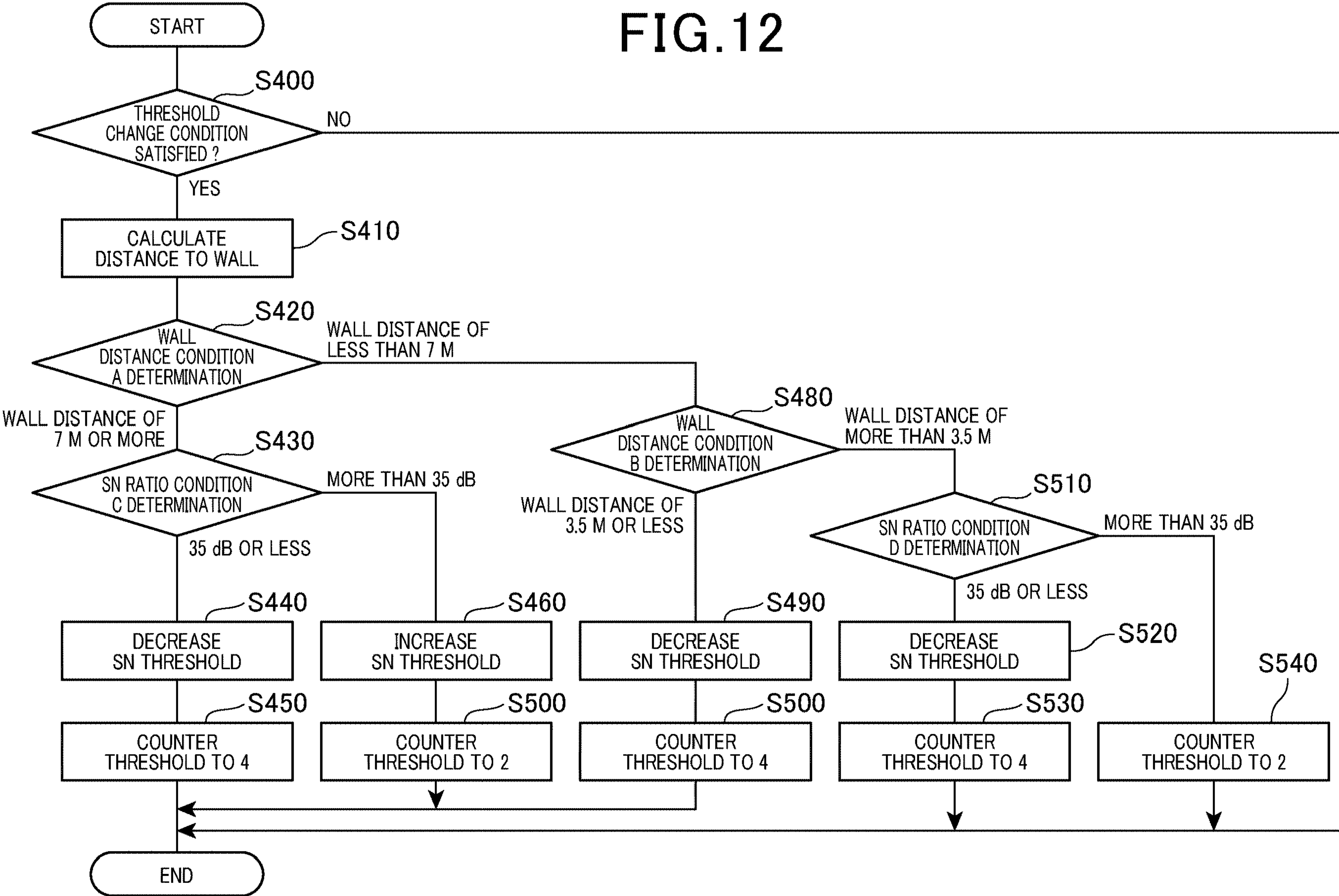
FIG.12
START
S400
THRESHOLD CHANGE CONDITION SATISFIED ?
NO
YES
S410
CALCULATE DISTANCE TO WALL
S420
WALL DISTANCE CONDITION A DETERMINATION
WALL DISTANCE OF LESS THAN 7 M
WALL DISTANCE OF 7 M OR MORE
S430
SN RATIO CONDITION C DETERMINATION
MORE THAN 35 dB
35 dB OR LESS
S480
WALL DISTANCE CONDITION B DETERMINATION
WALL DISTANCE OF MORE THAN 3.5 M
WALL DISTANCE OF 3.5 M OR LESS
S510
SN RATIO CONDITION D DETERMINATION
MORE THAN 35 dB
35 dB OR LESS
S440
DECREASE SN THRESHOLD
S460
INCREASE SN THRESHOLD
S490
DECREASE SN THRESHOLD
S520
DECREASE SN THRESHOLD
S540
S450
COUNTER THRESHOLD TO 4
S500
COUNTER THRESHOLD TO 2
S500
COUNTER THRESHOLD TO 4
S530
COUNTER THRESHOLD TO 4
COUNTER THRESHOLD TO 2
END

VEHICLE CONTROL DEVICE

CROSS-REFERENCE TO RELATED APPLICATION

The present application is a continuation application of International Application No. PCT/JP2021/043616, filed on Nov. 29, 2021, which claims priority to Japanese Patent Application No. 2020-203415, filed on Dec. 8, 2020. The contents of these applications are incorporated herein by reference in their entirety.

BACKGROUND

Technical Field

The present invention relates to a technique for a blind spot monitor that is capable of monitoring the rear side of the own vehicle and issuing an alarm as necessary.

Background Art

There have been conventionally known techniques for monitoring the surroundings of the own vehicle by a radar and controlling the own vehicle based on the states of other vehicles obtained by the radar.

In recent years, there has been developed a technique called blind spot monitor (BSM).

SUMMARY

In the present disclosure, provided is a vehicle control device as the following.

The vehicle control device assists in checking a rear side of an own vehicle. The vehicle control device includes a position estimation unit, an SN index calculation unit, a lane determination unit, and an alarm determination unit. The position estimation unit is configured to estimate a lateral position of an other vehicle based on a reflected wave of a radar wave. The SN index calculation unit is configured to calculate, based on the reflected wave of the radar wave, an SN index indicating a relationship between level of a noise and level of a signal. In response to determining a lane in which the other vehicle is traveling based on information on the lateral position of the other vehicle, the lane determination unit is configured to perform a determination on the lane based on the SN index. The alarm determination unit is configured to determine whether a condition for issuing an alarm about the other vehicle is satisfied based on a result of determination of the lane.

BRIEF DESCRIPTION OF THE DRAWINGS

FIG. 8 is a flowchart describing detailed contents of the alarm process performed by the vehicle control device.

FIG. 9 is an explanatory diagram illustrating an SN difference calculated from data detected by the radar devices while the other vehicle is travelling in the third lane.

FIG. 12 is a flowchart of a process for setting a counter threshold in a second embodiment.

DETAILED DESCRIPTION OF THE PREFERRED EMBODIMENTS

For example, PTL 1 describes a technique for monitoring the surroundings of the own vehicle by a radar and controlling the own vehicle based on the states of other vehicles obtained by the radar.

The BSM technique (hereinafter, called BSM control) is a technique for, when the own vehicle changes lanes during traveling, assisting the driver in checking the rear side of (that is, diagonally behind) the own vehicle in order to prevent a collision or the like with other vehicles.

That is, the BSM control is a control for detecting other vehicles traveling in the same direction in a lane adjacent to the own lane by radar and notify the presence of another vehicle in a region difficult for the driver of the own vehicle to look (for example, an obliquely backward blind-spot area). Under the BSM control, when the own vehicle is about to change lanes in the presence of another vehicle traveling in a region that is difficult for the driver to see, an alarm is issued to the driver of the own vehicle by visual indication, sound, or the like.

[PTL 1] JP 2019-2863 A

The inventor's detailed study of the above-described technique has revealed the disadvantages described below.

If there is a plurality of lanes that are the same in traveling direction, detecting another vehicle traveling in a lane (that is, another lane) other than the lane in which the own vehicle is traveling (that is, the own lane) may cause problems as described below.

Figure 5:
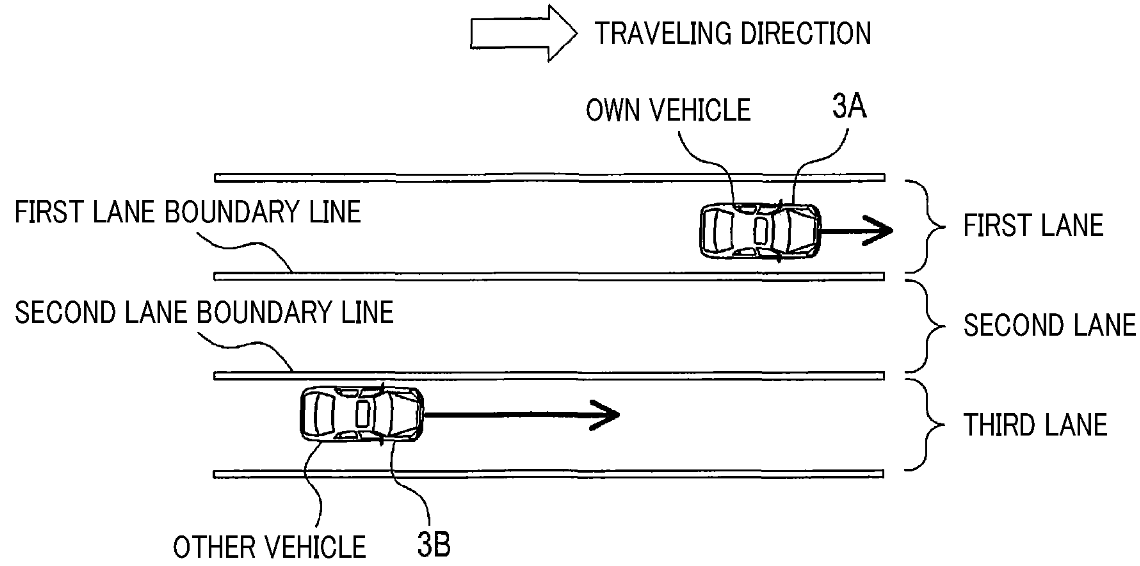
FIG. 5 is an explanatory diagram illustrating vehicles traveling on a road with a plurality of lanes.

In the following description, as illustrated in FIG. 5 described later, for example, a situation in which while the own vehicle is traveling in a first lane, another vehicle (that is, the target vehicle) is traveling in a third lane diagonally behind the own vehicle will be taken as an example.

If it is determined by radar that the other vehicle is traveling in the third lane, even though the own vehicle moves to the second lane, the possibility of a collision between the own vehicle and the other vehicle is low and thus no alarm is issued in general.

However, in a situation where the own vehicle and the other vehicle are traveling in adjacent lanes, for example, when the other vehicle has moved to the second lane, if the own vehicle moves to the second lane, there is a possibility of a collision between these vehicles. Therefore, for example, when the other vehicle has moved to the second lane, if there is a possibility of the occurrence of a collision due to the own vehicle's lane change, an alarm is issued before the own vehicle changes the lanes.

In the case of detecting the position of the other vehicle by reflection of a radio wave from a radar, the position of the other vehicle may not be correctly detected for some reason. That is, the lateral position of the other vehicle, indicating the lane in which the other vehicle is traveling, may not be accurately detected.

Thus, if it is erroneously determined that the other vehicle is traveling in the second lane even though the other vehicle is actually traveling in the third lane, an alarm may be issued unnecessarily.

In one aspect of the present disclosure, it is desired to provide a technique for accurately estimating the lane in which the other vehicle is traveling and appropriately issuing an alarm under BSM control.

One aspect of the present disclosure relates to a vehicle control device that uses radar waves to assist the driver in checking the rear side of the own vehicle.

The vehicle control device includes a position estimation unit, an SN index calculation unit, a lane determination unit, and an alarm determination unit.

The position estimation unit is configured to estimate a lateral position of another vehicle indicating a position in a width direction of a road, based on a reflected wave of the radar wave emitted from the own vehicle to surroundings.

The SN index calculation unit is configured to, based on the reflected wave of the radar wave emitted from the own vehicle to the surroundings, calculate an SN index indicating a relationship between level of a noise and level of a signal in the reflected wave.

The lane determination unit is configured to, in response to determining a lane in which the other vehicle is traveling based on information on the lateral position of the other vehicle estimated by the position estimation unit, perform a determination on the lane in which the other vehicle is traveling based on the SN index calculated by the SN index calculation unit.

The alarm determination unit is configured to, based on a result of determination by the lane determination unit, determine whether a condition for issuing an alarm about the other vehicle is satisfied.

According to these configurations, in one aspect of the present disclosure, the lane in which the other vehicle is traveling (that is, the traveling lane) can be accurately determined, so that at the time of the own vehicle's lane change, it is possible to appropriately issue an alarm about the other vehicle traveling in a blind-spot area or the like on the rear side of the own vehicle (that is, diagonally behind as viewed from the driver).

Hereinafter, detailed descriptions will be provided.

In the reflected wave of radar wave, the SN index indicating the relationship between the level of a signal (that is, S) from the target (that is, the other vehicle) and the level of a noise (that is, noise: N) affects the accuracy of estimation of the lateral position of the other vehicle.

The SN index is an index representing the difference in magnitude between the level of a noise and the level of a signal such as the ratio of the level of a signal to the level of a noise (that is, SN ratio: S/N) or the difference between the level of a signal and the level of a noise (that is, SN difference: S−N). The accuracy of estimation of the lateral position of the other vehicle varies depending on the magnitude of the SN index. In the case of representing the level by the magnitude of voltage, the magnitude of the level can be expressed by the magnitude of voltage.

For example, if the SN ratio or the SN difference is large, the accuracy of estimation of the lateral position is high. On the other hand, if the SN ratio or the SN difference is small, the accuracy of estimation of the lateral position is low. Therefore, in the case of determining the traveling lane of the other vehicle, it is possible to more reliably determine the traveling lane of the other vehicle by taking the SN ratio or the SN difference into account.

Thus, for example, if the accuracy of determination of the traveling lane of the other vehicle is high, it is possible to appropriately issue an alarm in accordance with the determination result. On the other hand, if the accuracy of determination on the traveling lane of the other vehicle is low, for example, it is possible to enhance the accuracy of determination on the traveling lane by further taking other conditions into consideration in the determination and appropriately issue an alarm in accordance with the determination result.

That is, in one aspect of the present disclosure, it is possible to produce significant advantageous effects that, at the time of the own vehicle's lane change, an alarm can be issued appropriately when it is supposed to be, and the unnecessary issuance of an alarm can be suppressed when there is no need to issue an alarm.

Hereinafter, embodiments of the present disclosure will be described with reference to the drawings.

1. First Embodiment

1-1. Overall Configuration

First, an overall configuration of a vehicle control system including a vehicle control device in a first embodiment will be described.

Figure 1:
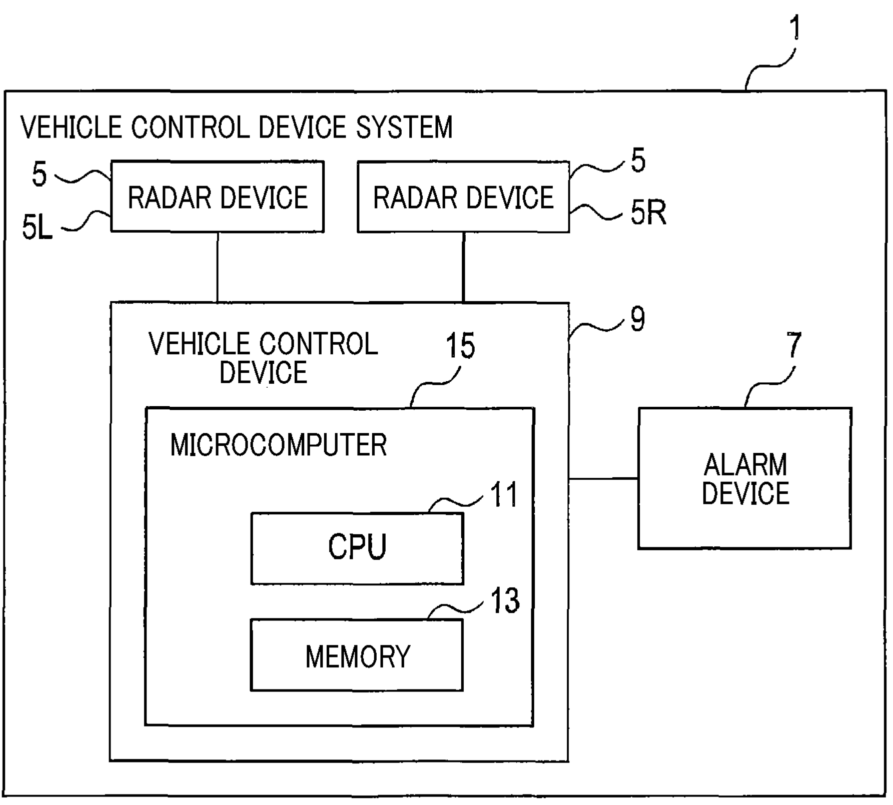
FIG. 1 is a block diagram illustrating a configuration of a vehicle control system in a first embodiment.

As illustrated in FIG. 1, a vehicle control system 1 in the first embodiment is mounted to a vehicle 3 (for example, see FIG. 2) and is configured to detect objects around the vehicle 3 and issue an alarm as necessary. The vehicle control system 1 includes two radar devices 5L and 5R, an alarm device 7, and a vehicle control device 9. In the following description, the vehicle 3 may be divided into an own vehicle 3A and another vehicle 3B.

Figure 2:
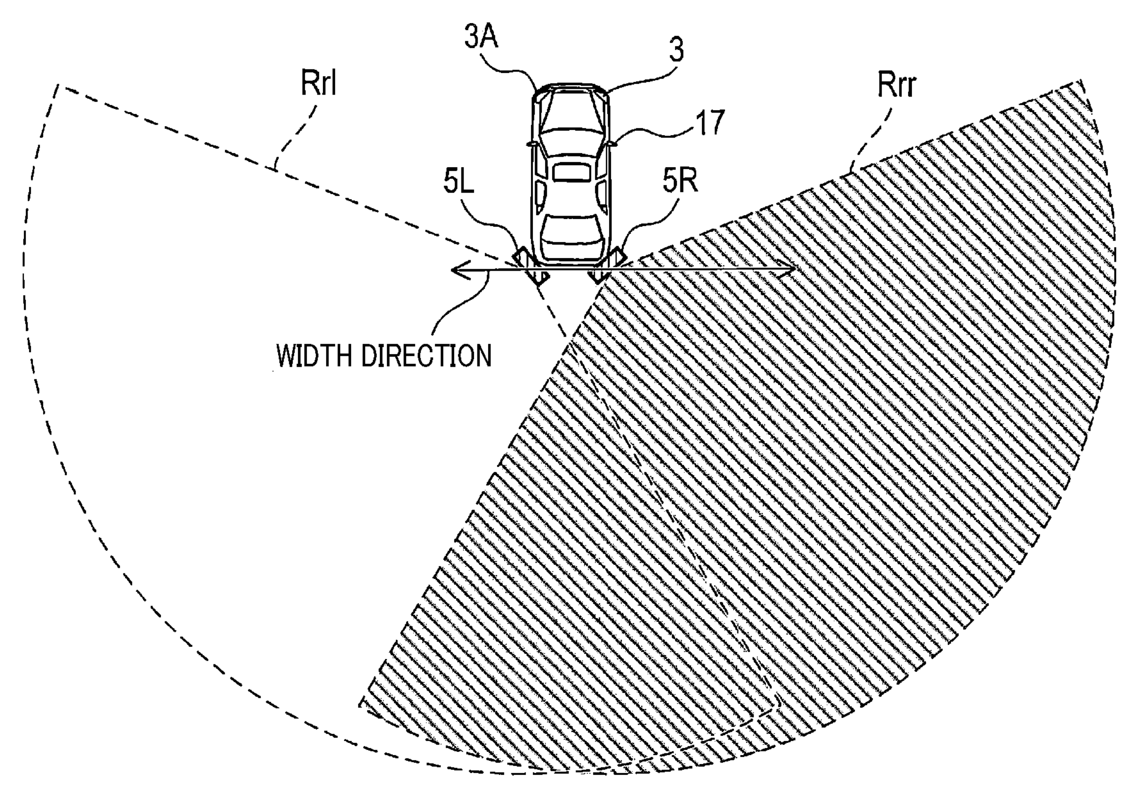
FIG. 2 is an explanatory diagram illustrating the detection ranges of radar devices in a vehicle.

As illustrated in FIG. 2, the radar device 5L is a left-side radar device disposed on the rear left side surface of the vehicle 3, and the radar device 5R is a right-side radar device disposed on the rear right side surface of the vehicle 3. The two radar devices 5L and 5R are basically the same in configuration and function. Hereinafter, the two radar devices 5L and 5R will also be collectively called radar devices 5. The vehicle control system 1 may include at least one radar device, and may include three or more radar devices.

The radar devices 5 are well-known detection devices using radio waves that repeatedly transmit and receive radar waves and monitor the surroundings of the vehicle 3. The radar devices 5 may be millimeter-wave radars using millimeter waves, for example. The radar waves may be radio waves with a frequency of 30 GHz or more and with a wavelength of 1 cm or less, for example.

In the first embodiment, transmission signals modulated by the FMCW method and transmission signals modulated by the 2FCW method are used to detect an object that is a target (that is, target object). However, the present invention is not limited to this. FMCW is an abbreviation of Frequency Modulated Continuous Wave. 2FCW is an abbreviation of 2 Frequency Continuous Wave.

As is commonly known, the FMCW method and the 2FCW method have their respective advantages and disadvantages, and thus data obtained by the method with a higher detection accuracy can be employed in accordance with the situation of surroundings and the like as is publicly known (for example, see JP 2019-2863).

The radar devices 5L and 5R transmit radar waves from their positions to the left side and the right side behind the own vehicle 3A, respectively, thereby to detect objects including moving objects in an object detection region. For example, the radar devices 5L and 5R detect objects such as other vehicles 3B such as automobiles and motorcycles behind, diagonally behind, and on lateral sides of the own vehicle 3A.

FIG. 2 illustrates an object detection region Rrr of the right-side radar device 5R as a hatched region on a horizontal plane. FIG. 2 also illustrates an object detection region Rrl of the left-side radar device 5L symmetrical to the object detection region Rrr, and the outer peripheries of these regions are shown by broken lines.

The radar devices 5 function as transmitters that transmit transmission waves based on a predetermined transmission signal and function as radar sensors that receive reflected waves from objects having reflected the transmission waves as reception waves. The radar devices 5 convert the reception wave having an analog waveform into a digital signal, and send the reception wave having been converted into a digital signal, that is, an AD waveform to the vehicle control device 9.

The alarm device 7 is a well-known device that, if the vehicle control device 9 detects a moving object approaching the vehicle 3 from behind or diagonally behind, issues an alarm in response to a command from the vehicle control device 9. The alarm device 7 includes a sound output device disposed in the vehicle interior, for example, to output an alarm sound to the passenger of the vehicle 3. Alternatively, the alarm device 7 emits alarm light by an indicator lamp or the like arranged at the door mirror or the meter panel in front of the driver's seat.

1-2. Electrical Configuration of Vehicle Control Device

Next, an electrical configuration of the vehicle control device 9 will be described. The vehicle control device 9 is an electronic control device that is formed mainly of a well-known microcomputer 15 including a CPU 11 and a memory 13 such as a ROM or a RAM, as illustrated in FIG. 1.

Various functions of the microcomputer 15 are performed by the CPU 11 executing programs stored in a non-transitory tangible recording medium. In this example, the memory 13 corresponds to the non-transitory tangible recording medium storing the programs. When any of the programs is executed, the method corresponding to the program is executed.

The non-transitory tangible recording medium refers to a recording medium except for electromagnetic waves. Some or all of the functions performed by the CPU 11 may be implemented by hardware such as one or more ICs. One or more microcomputers 15 may constitute the vehicle control device 9.

As described later in detail, the vehicle control device 9 estimates the lateral position of the other vehicle 3B (the position as viewed in the width direction of the lane) based on signals of reflected waves of radar waves obtained from the radar devices 5, and determines in which lane the other vehicle 3B is traveling. Then, the vehicle control device 9 issues an alarm as necessary (for example, if there is a possibility of a collision).

That is, the vehicle control device 9 assists the driver in checking the rear side of the own vehicle 3A to achieve safety of the own vehicle 3A at the time of a lane change on a road with a plurality of lanes.

Specifically, the vehicle control device 9 detects the lane in which the other vehicle 3B is traveling from the position of the other vehicle 3B traveling in the same direction as the own vehicle 3A (for example, the other vehicle 3B on the rear side of the own vehicle 3A). Then, if it is determined that there is a possibility of a collision between the own vehicle 3A and the other vehicle 3B when the own vehicle 3A moves to the lane in which the other vehicle 3B is traveling, the vehicle control device 9 issues an alarm.

The rear side of the own vehicle 3A refers to an area diagonally behind the driver seated in the driver's seat, where it is difficult for the driver to see the other vehicle 3B such as in a blind spot hidden by a side mirror 17 (for example, see FIG. 2) or the like. For example, the rear side of the own vehicle 3A is an area in other than the own lane, rearward from right beside of the driver (driver's seat).

Figure 3:
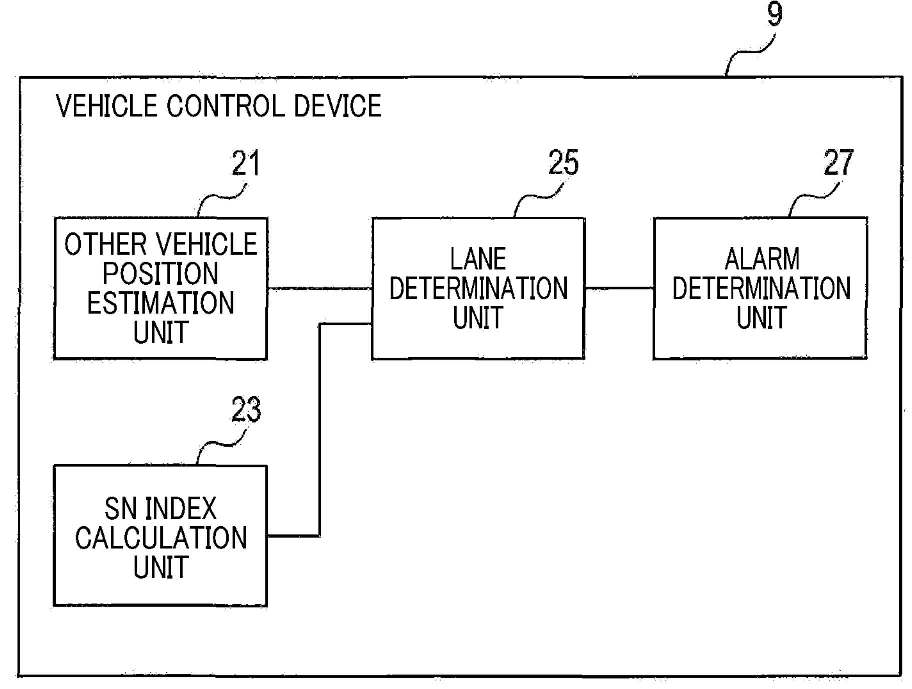
FIG. 3 is a block diagram functionally illustrating a vehicle control device.

The vehicle control device 9 includes a position estimation unit 21, an SN index calculation unit 23, a lane determination unit 25, and an alarm determination unit 27 as functionally illustrated in FIG. 3.

The position estimation unit 21 is configured to estimate the lateral position of the other vehicle 3B in the width direction of the road (that is, lateral position with respect to the own vehicle 3A), based on the reflected waves of radar waves emitted from the own vehicle 3A to the surroundings.

The SN index calculation unit 23 is configured to, based on a reflected wave of radar wave emitted from the own vehicle 3A to the surroundings, calculate the SN index indicating the relationship between the level of signal and the level of noise in the reflected wave.

As is well known, the level of noise here is, for example, the intensity of all signals in the entire reflected wave or the intensity of signals obtained by excluding signals at predetermined or higher levels (for example, signals estimated as indicating the target) from the entire reflected wave. The level of signal refers to the intensity of the signals indicating the target in the reflected wave (that is, the signals of reflection by the target). The intensity can be indicated by electric power or voltage of the reflected wave, for example.

Therefore, the SN index indicating the relationship between the level of signal and the level of noise is the index that indicates to what degree the level of signal of the target is different from the level of noise, that is, indicates the difference in magnitude between the two levels. The SN index can be represented by the ratio of the two levels (for example, S/N:SN ratio) or the difference between the two levels (for example, S−N: SN difference). In the case of indicating the two levels by voltage, the difference in magnitude between the two levels can be represented by the relationship in magnitude of the voltages.

In the first embodiment, the SN index calculation unit 23 is configured to, based on a reflected wave of radar wave emitted from the own vehicle 3A to the surroundings, calculate the SN ratio indicating the ratio between the level of signal and the level of noise in the reflected wave.

The lane determination unit 25 is configured to, in the case of determining the lane in which the other vehicle 3B is traveling based on the information on the lateral position of the other vehicle 3B estimated by the position estimation unit 21, determine the lane in which the other vehicle 3B is traveling based on the SN index (for example, the SN ratio) calculated by the SN index calculation unit 23.

The alarm determination unit 27 is configured to, based on the result of determination by the lane determination unit 25, determine whether the condition for issuing an alarm about the other vehicle 3B is satisfied. Therefore, if the condition for issuing an alarm is satisfied, the alarm can be issued.

1-3. Contents of Processes

Next, various processes executed by the vehicle control device 9 will be described with reference to the flowcharts. These processes are repeatedly executed in predetermined cycles (for example, at each scanning by the radar devices 5).

1-3-1. Main Processing

First, the entire processing (main processing) executed by the vehicle control device 9 will be described with reference to the flowchart of FIG. 4.

Figure 4:
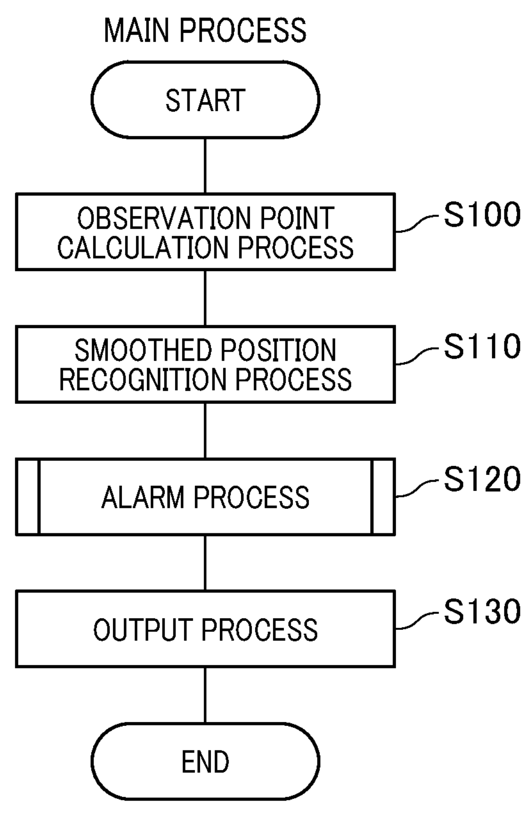
FIG. 4 is a flowchart of a main process performed by the vehicle control device.

As illustrated in FIG. 4, in step (hereinafter, S) 100, the vehicle control device 9 performs an observation point calculation process for determining observation points by a publicly known method.

In the observation point calculation process, first, the vehicle control device 9 acquires the waveform (that is, AD waveform) of reflected waves (reception waves) of radar waves emitted from the radar devices 5.

Subsequently, the vehicle control device 9 generates an FFT waveform. The FFT waveform is a waveform obtained by subjecting the AD waveform to well-known fast Fourier transform. FFT is an abbreviation of Fast Fourier Transform.

Then, based on the FFT waveform, the vehicle control device 9 calculates the observation points that are the reflection points of the radar wave.

Specifically, this observation point calculation process is performed as described below, for example.

First, the vehicle control device 9 generates, from the AD waveform, a beat signal that is a frequency difference signal with the difference in frequency between the transmission signal and the reception signal as a frequency.

Then, the vehicle control device 9 executes frequency analysis process by the FFT on the generated beat signal to generate a frequency spectrum that is the FFT waveform. At that time, the vehicle control device 9 generates a frequency spectrum from the beat signal by each modulation method.

The frequency spectrum is data that indicates the relationship between each frequency component of the transmission signal from the radar devices 5 and the signal intensity corresponding to the frequency component. The signal intensity can be represented by power or voltage of the received signal.

In the first embodiment, the vehicle control device 9 detects an object (that is, target object) by a well-known FMCW method. Here, the vehicle control device 9 obtains a frequency spectrum of a frequency rise part and a frequency fall part of the beat signal, and extracts azimuth θ of the object and power information based on the frequency spectrum. Then, the vehicle control device 9 uses the extracted azimuth θ and power information to calculate the speed of the object (for example, the other vehicle 3B) relative to the own vehicle 3A (that is, relative speed) and a distance R from the own vehicle 3A to the other vehicle 3B.

In the first embodiment, the vehicle control device 9 also detects an object by a well-known 2FCW method. That is, the vehicle control device 9 generates respective frequency spectrums from respective beat signals of two transmission frequencies, and extracts the azimuth θ and power information of the other vehicle 3B based on the two generated frequency spectrums. The vehicle control device 9 uses the extracted azimuth θ and power information to calculate the speed of the other vehicle 3B relative to the own vehicle 3A (that is, relative speed) and the distance R from the own vehicle 3A to the other vehicle 3B.

Selection of either the distances R and the azimuths θ obtained by the FMCW method, or by the 2FCW method, can be performed by a publicly known method described in the patent document described above. The positions of the observation points that are reflection points of radar waves can be obtained from the distance R and the azimuth θ.

In subsequent step S110, the vehicle control device 9 performs a publicly known smoothed position recognition process. In the smoothed position recognition process, a process of smoothing data at the observation points obtained in step S100 (that is, filtering process) is performed to estimate the position at which the other vehicle 3B is traveling (that is, traveling position).

That is, the smoothed position recognition process is a process of obtaining the smoothed position that is the traveling position of the other vehicle 3B by the filtering process on the data of the observation points. The locus of the other vehicle 3B can be estimated by temporal changes in the smoothed position.

Hereinafter, the relationship between the observation point and the smoothed position will be described.

For example, as illustrated in FIG. 5, if there is a plurality of lanes (that is, one-way lanes) in the same traveling direction, the lane in which the own vehicle 3A is traveling (that is, the own lane) will be designated as first lane, the lane adjacent to the own lane will be designated as second lane, and the lane adjacent to the second lane and opposite to the own lane will be designated as third lane.

The boundary line (that is, lane boundary line) between the first lane and the second lane will be designated as first lane boundary line, and the boundary line between the second lane and the third lane will be designated as second lane boundary line.

For example, if the other vehicle 3B is traveling in the third lane obliquely behind the own vehicle 3A, the radar devices 5 can estimate the traveling positions, and thus, locus of the other vehicle 3B.

Figure 6:
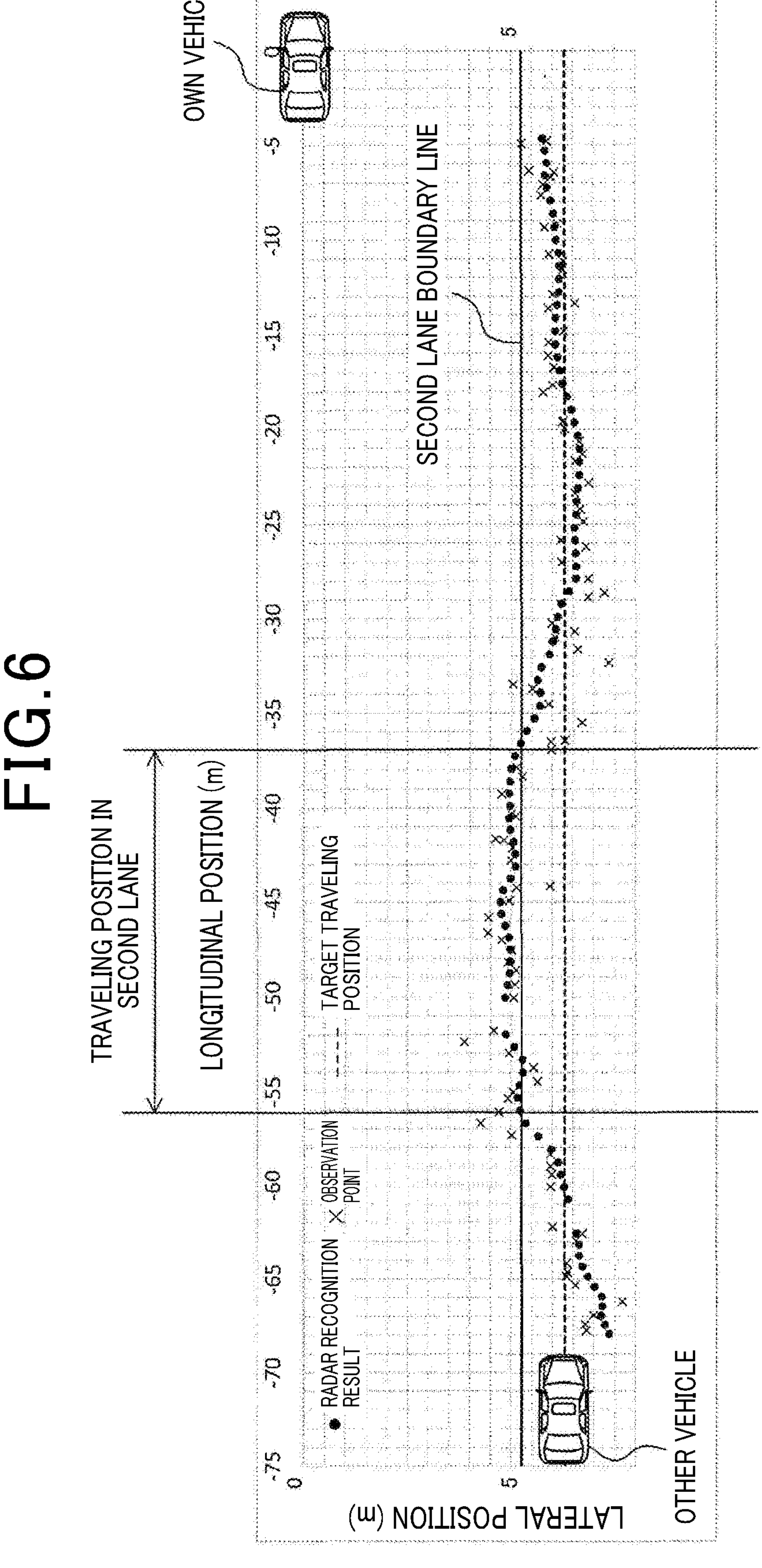
FIG. 6 is an explanatory diagram illustrating observation points and traveling positions of an other vehicle detected by the radar devices while the other vehicle is traveling in the third lane.

FIG. 6 illustrates data on the observation points and traveling positions (that is, smoothed positions) of the other vehicle 3B in the case where the own vehicle 3A and the other vehicle 3B are traveling in the same direction in different lanes. In this example, the other vehicle 3B is actually traveling in the third lane, and the actual locus of the other vehicle 3B is denoted by the target traveling positions shown by a broken line in FIG. 6.

FIG. 6 illustrates the traveling positions of the other vehicle 3B obtained by the radar devices 5 as radar recognition results, and these traveling positions are the traveling positions with no consideration given to the SN ratio. That is, in the first embodiment, as described later, the accuracy of estimation of the traveling positions of the other vehicle 3B is enhanced with consideration given to the SN ratio.

Referring to FIG. 6, the estimated traveling positions of the other vehicle 3B are in the third lane or the second lane. That is, if the traveling position of the other vehicle 3B is under the second lane boundary line shown in FIG. 6 (that is, in the third lane), it is determined that the other vehicle 3B is traveling in the third lane. If the traveling position of the other vehicle 3B is above the second lane boundary line shown in FIG. 6 (that is, in the second lane), it is determined that the other vehicle 3B is traveling in the second lane.

Referring to FIG. 6, the lateral position is indicated by the distance from the own vehicle 3A in the width direction with the position of the own vehicle 3A (that is, the central position of the own vehicle 3A as viewed in the width direction) at 0 m, and the value of the lateral position becomes larger with increasing proximity to the third lane. The longitudinal position is indicated by the distance backward from the own vehicle 3A with the position of the own vehicle 3A (that is, the central position of the own vehicle 3A as viewed in the traveling direction) at 0 m, and the absolute value of the longitudinal position becomes larger toward the back side. The backward positions are indicated with the minus symbol.

As is well known, the traveling position (that is, the smoothed position) of the other vehicle 3B can be obtained by various filtering processes using the data of the observation points.

In the first embodiment, a filtering process is performed using a general Kalman filter.

The filtering process using a Kalman filter is a method for estimating the most appropriate state of the system (that is, the covariance of error in estimation is minimum) based on immediately prior information (that is, predictions) and currently acquired data (that is, observations). However, the measurement values (that is, data) includes noise according to a normal distribution, and the variances indicating the state of the system also include noise according to a normal distribution.

Specifically, the following two steps are repeatedly executed with time evolution. That is, the transition from "Correct" step to "Predict" step and the transition from "Predict" step to "Correct" step are repeatedly performed.

"Correct" step [a: update of observation, b: estimation of current values]

"Predict" step [c: update of time, d: prediction of next values]

The "prediction" indicates the state predicted using the previous values and is also called a prior estimation. The "estimation" indicates the state estimated using the prediction and is also called a posterior estimation. The "prediction" and "estimation" are performed based on their respective predetermined models.

Besides the above-described filtering process, publicly known filtering processes such as the α-β filtering process described in JP 2020-12795 A, for example, can be employed.

Returning to FIG. 4, in subsequent step S120, the vehicle control device 9 performs an alarm process as described later in detail. The alarm process is a process of determining the traveling lane of the other vehicle 3B with addition of the SN ratio condition described later to the information on the traveling position of the other vehicle 3B determined in step S110, and determining whether there is a risk of a collision between the own vehicle 3A and the other vehicle 3B if the own vehicle 3A moves to the second lane, for example.

In subsequent step S130, the vehicle control device 9 performs an output process and temporarily ends the processing. The output process is a process of, if there is a risk of a collision between the own vehicle 3A and the other vehicle 3B due to movement of the own vehicle 3A to the second lane, issuing an alarm using the alarm device 7 to the driver.

1-3-2. Alarm Process

Next, the overview of the alarm process in step S120 will be described with reference to the flowchart in FIG. 7.

The alarm process is a process of performing a predetermined alarm determination if it is determined that the other vehicle 3B traveling in the third lane has moved to the second lane.

Specifically, if the SN ratio of reflected wave of a radar wave is higher than a predetermined value as described later, the vehicle control device 9 determines that there is a high possibility of the other vehicle 3B being traveling in the second lane, and performs an alarm determination taking into account other conditions such as inter-vehicle distance and vehicle speed. On the other hand, if the SN ratio is equal to or lower than the predetermined value, the vehicle control device 9 determines that there is a possibility of the other vehicle 3B being traveling in the third lane, and takes time to determine the degree of the possibility and performs an alarm determination taking the other conditions into account.

The SN ratio of reflected wave of a radar wave is the ratio of power to noise floor of the FFT spectrum (that is, signal) as is well known, and can be obtained by the radar devices 5 or the vehicle control device 9, for example.

Figure 7:
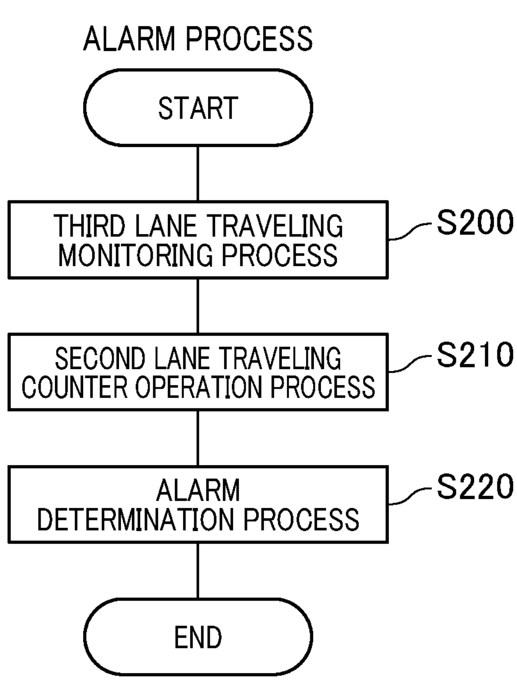
FIG. 7 is a flowchart of an alarm process performed by the vehicle control device.

As described in FIG. 7, first, in step S200, the vehicle control device 9 performs a third lane traveling monitoring process. The third lane traveling monitoring process is a process of monitoring whether the other vehicle 3B is traveling in the third lane.

That is, in the processing of the first embodiment, first, the vehicle control device 9 performs a process of specifying and monitoring the other vehicle 3B traveling in the third lane, in order to detect that the traveling lane of the other vehicle 3B has moved (that is, merged in) to the second lane adjacent to the traveling lane of the own vehicle 3A, as in the case where the other vehicle 3B has made a lane change from the third lane to the second lane.

In subsequent step S210, the vehicle control device 9 performs a second lane traveling counter operation process. The second lane traveling counter operation process is a process of setting a value of a predetermined counter that is used to determine that the other vehicle 3B is traveling in the second lane. That is, the second lane traveling counter operation process is a process of setting a value of a second lane traveling counter in accordance with the magnitude of the SN ratio of reflected wave of a radar wave as described later in detail. The SN ratio is acquired from the radar devices 5 or calculated by the vehicle control device 9 prior to the second lane traveling counter operation process.

In subsequent step S220, the vehicle control device 9 performs an alarm determination process and temporarily ends the processing. The alarm determination process is a process of determining whether to issue the above-described alarm.

1-3-3. Details of Alarm Process

Next, the specific contents of the alarm process mentioned above with reference to FIG. 7 will be described in detail with reference to the flowchart of FIG. 8.

Figure 8:
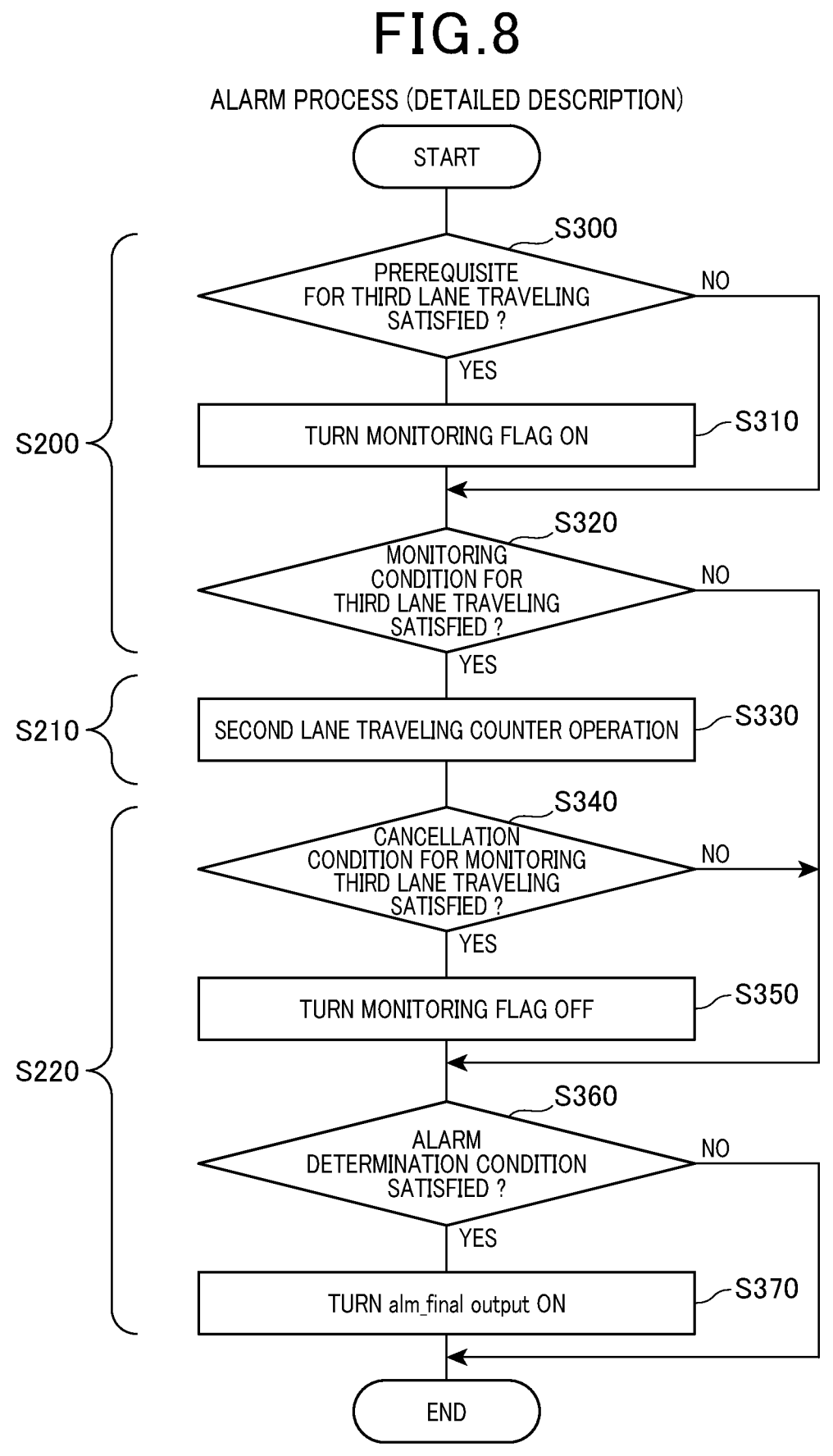

Steps S300 to S320 in FIG. 8 correspond to the third lane traveling monitoring process in step S200 in FIG. 7, step S330 in FIG. 8 corresponds to the second lane traveling counter operation process in step S210 in FIG. 7, and steps S340 to S370 in FIG. 8 correspond to the alarm determination process in step S220 in FIG. 7.

<<Third Lane Traveling Monitoring Process>>

As described in the flowchart of FIG. 8, in step S300, the vehicle control device 9 determines whether the determination target object (that is, the other vehicle 3B) satisfies prerequisite conditions for determination on traveling in the third lane. If the vehicle control device 9 makes an affirmative determination, the process proceeds to step S310. On the other hand, if the vehicle control device 9 makes a negative determination, the process proceeds to step S320.

Next, the prerequisite conditions will be described. The prerequisite conditions are conditions for determining whether the other vehicle 3B is traveling in the third lane. As described in Table 1 below, if [Condition ZJ1] and [Condition ZJ2] (that is, AND conditions) are satisfied, the vehicle control device 9 determines that the other vehicle 3B is traveling in the third lane.

TABLE 1

| <Prerequisite conditions: AND conditions> | |
|---|---|
| ZJ1 | Target is traveling in third lane |
| ZJ2 | Third lane exists |

More specifically, [Condition ZJ1] is the condition that "the other vehicle 3B is traveling in the third lane", which can be determined from the smoothed position (that is, traveling position) of the other vehicle 3B obtained by the smoothed position recognition process described above. That is, the lane in which the other vehicle 3B is traveling can be determined from the lateral position of the other vehicle 3B. For example, if the lateral position of the other vehicle 3B is within a predetermined range corresponding to a predetermined lane, it can be determined that the other vehicle 3B is traveling in the predetermined lane. The alarm timing is not changed for the other vehicle 3B traveling in a lane other than the third lane.

[Condition ZJ2] is the condition that "the third lane exists", which can be determined from the state of the reflected wave of a radar wave. That is, if there is a sufficient distance for the third lane to exist from the second lane side (that is, the outside) of the own vehicle 3A, it can be determined that the third lane exists.

More specifically. if there is a wall extending along the road, for example, the distance from the own vehicle 3A to the wall can be detected by the radar devices 5, and thus it can be determined from the distance whether the third lane exists.

This determination is performed because if there is a wall on the outer side of the second lane, there is a possibility of erroneous determination that the other vehicle 3B is traveling in the third lane due to the presence of the wall (that is, due to the influence of the wall) even though the other vehicle 3B is actually traveling in the second lane.

Besides [Condition ZJ1] and [Condition ZJ2], other conditions may be added. For example, at least one of [Condition ZJ3] that the distance from the own vehicle 3A to the other vehicle 3B in the traveling direction (that is, longitudinal distance) is equal to or greater than a predetermined value and [Condition ZJ4] that the number of times of tracking (that is, the number of times of continuous connection) is equal to or greater than a predetermined number of times may be added as an AND condition.

In step S310 to which the process proceeds if the prerequisite conditions are satisfied, the vehicle control device 9 sets (that is, turns on) a monitoring flag on the corresponding other vehicle 3B. That is, the vehicle control device 9 sets the corresponding other vehicle 3B as a monitoring target.

In the subsequent process, the vehicle control device 9 determines whether the other vehicle 3B as a monitoring target with the monitoring flag turned on, that is, the other vehicle 3B determined as traveling in the third lane has moved (that is, merged in) to the second lane.

In subsequent step S320, the vehicle control device 9 determines whether the condition for monitoring traveling in the third lane is satisfied. That is, the vehicle control device 9 determines whether the monitoring flag is ON for the other vehicle 3B as a monitoring target. If the vehicle control device 9 makes an affirmative determination, the process proceeds to step S330. On the other hand, if the vehicle control device 9 makes a negative determination, the process proceeds to step S360.

<<Second Lane Traveling Counter Operation Process>>

In step S330, the vehicle control device 9 performs a second lane traveling counter operation process. The second lane traveling counter operation process is a process of operating a second lane traveling counter (hereinafter, traveling counter). That is, the second lane traveling counter operation process is a process of operating the traveling counter that is used to determine whether the other vehicle 3B as a monitoring target has moved from the third lane to the second lane.

The traveling counter is a counter that is used to determine whether the other vehicle 3B is traveling in the second lane. The counter value is incremented or decremented if predetermined conditions are satisfied as described in Table 2.

This traveling counter makes it possible to determine whether the lateral position of the other vehicle 3B has been shifted during traveling in the third lane due to a decrease in the SN ratio (that is, erroneous detection of the lane) or whether the other vehicle 3B is actually traveling in the second lane, using the SN ratio and adjacent lane probability as described later. The higher the counter value, the higher the possibility of the other vehicle 3B being traveling in the second lane.

Hereinafter, the details of operations will be described with reference to Table 2.

The initial value of the traveling counter is 0, the maximum value is 5, and the minimum value is 0. SN thresholds S1, S2, and S3 are in the relationship of S1>S2>S3. S1, S2, and S3 can take on values of 44 dB, 40 dB, and 35 dB, respectively, for example. The SN thresholds are thresholds set for determining the magnitude of the SN ratio, which can be set by experiment or the like.

TABLE 2

| Operations of traveling counter | | Conditions: SN ratio | Conditions: Adjacent lane probability | Conditions: Connection state | Note |
|---|---|---|---|---|---|
| Operations | (A) Increment (+1) | SN ratio ≥ SN threshold (S1) | None | Continuous | AND condition |
| | (B) Increment (+1) | SN threshold (S2) ≤ SN ratio < SN threshold (S1) | P(t) ≥ 70% | Continuous | AND condition |
| | (C) Increment (+1) | SN ratio ≤ SN threshold (S3) | None | Continuous | AND condition |
| Holding (no operation) | | Other than above | | Extrapolation | OR condition |
| Clear | | New detection occurs or monitoring flag turns on to off | | | — |

<Case of Operation (A)>

If the SN ratio is equal to or greater than an SN threshold (for example, 51) that is a predetermined threshold and the monitoring target (that is, the other vehicle 3B) has been continuously recognized as the same target from the previous time (that is, if the connection state is continuous), the traveling counter is incremented (for example, by one). Herein, the adjacent lane probability is not used.

The continuously connection state refers to the state in which the same target has been continuously detected from the previous time to the current time as publicly known. If a predetermined condition (a condition on which the previous and current targets can be determined as the same) is satisfied, the connection state is determined as continuous.

In the case of the operation (A), the SN ratio is high and the angle indicating the accuracy of azimuth of the reflection point is stable. If the azimuth of the reflection point is within the target range, the angle is stable.

Therefore, if it is estimated that the traveling position (that is, the smoothed position) of the other vehicle 3B is in the second lane based on the signals from the radar devices 5, there is a high possibility that the other vehicle 3B has actually merged into the second lane from the third lane in the state where the SN ratio is high and the angle is stable.

<Case of Operation (B)>

If the SN ratio is within a predetermined range of SN thresholds (for example, equal to or greater than S2 and smaller than S1) and an adjacent lane probability P(t) is 70% or more and the connection state is continuous, the traveling counter is incremented (for example, by one).

The adjacent lane probability is publicly known as described in JP 2016-85567 A, for example, and thus will be simply described here. The adjacent lane probability is a probability that there exists a target in a lane (that is, the second lane) adjacent to the own lane, which can be expressed by the following equation (1), for example:

$$P(t)=P0.2+P(t-1)0.7 \quad (1)$$

where P: Adjacent lane probability (instantaneous value)

P(t): Adjacent lane probability (filter value)

t: Cycle of process for obtaining the adjacent lane probability

In the case of the operation (B), it is difficult to determine whether the other vehicle 3B is traveling in the third lane or has merged into the second lane only by the SN ratio, and thus the condition of adjacent lane probability is taken into account in the determination.

<Case of Operation (C)>

If the SN ratio is equal to or less than a predetermined SN threshold (for example, S3) and the connection state is continuous, the traveling counter is decremented (for example, by one). Herein, the adjacent lane probability is not used.

In the case of the operation (C), the SN ratio is low and the angle is not stable, that is, the probability of determination that the traveling position of the other vehicle 3B is in the second lane is low. Thus, the traveling counter is decremented.

<Case of Holding>

If the conditions of SN ratio and adjacent lane probability in the operations (A) to (C) described above are not satisfied or if the connection state is extrapolation, the value of the traveling counter is held without change.

The extrapolation here means the state in which the condition that the previously detected target and the currently detected target are identical (that is, continuous) as publicly known (for example, refer to JP 2020-12795 A) is not satisfied but it can be estimated (extrapolated) that the two targets are highly possibly the same from the traveling state of the previously detected target.

<Case of Clearing>

If the target is a newly detected target (that is, the other vehicle 3B) or if the monitoring flag is turned from on to off (that is, turn-off), the value of the traveling counter is reset (that is, set to zero).

In this manner, in the second lane traveling counter operation process, the value of the traveling counter is set using the SN ratio and/or the adjacent lane probability.

FIG. 9 illustrates the difference in voltage (that is, S−N), for example, between the level of signal (that is, S) and the level of noise (that is, N) in the target in the case where it is estimated that the other vehicle 3B is traveling in the third lane or the second lane. In FIG. 9, S−N is described as SN. FIG. 9 corresponds to the graph in FIG. 6 and illustrates the state of SN in the other vehicle 3B at the same longitudinal position.

<<Alarm Determination Process>>

In subsequent step S340, the vehicle control device 9 determines whether the condition for canceling the monitoring of traveling in the third lane is satisfied. If the vehicle control device 9 makes an affirmative determination, the process proceeds to step S350. On the other hand, if the vehicle control device 9 makes a negative determination, the process proceeds to step S360.

The condition for cancelling the monitoring of traveling in the third lane is a condition on which it is determined whether to reset (that is, turn off) the monitoring flag of the other vehicle 3B that has been turned on due to the satisfaction of the prerequisite conditions described above.

Table 3 shows the condition for cancelling the monitoring of traveling in the third lane. As shown in Table 3, if even one of cancellation conditions is met, the vehicle control device 9 determines that the condition for cancelling the monitoring is satisfied, and cancels the monitoring of the vehicle 3 as a monitoring target that is traveling in the third lane. Cancelling the monitoring makes it possible to quickly issue an alarm as described later.

TABLE 3

| Monitoring is cancelled if any of cancellation conditions is met | | Notes |
|---|---|---|
| Cancellation condition 1 | Target is not travelling in third lane<br>Traveling counter value of second lane ≥ counter threshold | AND condition |
| Cancellation condition 2 | Target is not travelling in third lane<br>TTC is 3 sec or less | AND condition |
| Cancellation condition 3 | No third lane exists | — |
| Cancellation condition 4 | Past alarm flag of target is ON<br>Past monitoring flag of target is OFF | AND condition |

<Case of Cancellation Condition 1>

If the other vehicle 3B is not traveling in the third lane and the value of the traveling counter is equal to or greater than a predetermined counter threshold, it is determined that the condition for cancelling the monitoring is satisfied.

That is, if the vehicle control device 9 detects that the other vehicle 3B is not traveling in the third lane and is traveling in the second lane a predetermined number of times (that is, equal to or greater than the counter threshold), the vehicle control device 9 determines that there is a high possibility of the other vehicle 3B having moved from the third lane to the second lane, and cancels the monitoring of the other vehicle 3B having been traveling in the third lane.

More specifically, the fact that the other vehicle 3B as a monitoring target having been traveling in the third lane is no longer traveling in the third lane can be determined from the traveling position (that is, the smoothed position) of the other vehicle 3B. In addition, it can be determined that the other vehicle 3B can be stably detected as traveling in the second lane because the condition is met that the value of the traveling counter is equal to or greater than the predetermined counter threshold. For this reason, it can be determined that the other vehicle 3B has merged from the third lane into the second lane.

The counter threshold here is changed depending on the SN threshold. The reason for changing the counter threshold in this manner is to determine the traveling in the second lane at the same accuracy, regardless of the magnitude of a disturbance affecting the detection accuracy of the radar devices 5. The SN threshold is set as appropriate in accordance with the degree of a disturbance, for example. The disturbance is an element of the external environment of the own vehicle 3A that affects the accuracy of detecting the target (that is, the other vehicle 3B) by influencing the reflected waves from the radar devices 5. Such a disturbance is a wall, for example.

As described later, if the disturbance is small, for example, the SN threshold is set high. However, if the SN threshold is high, the counter threshold is set to a low value (for example, 2). On the other hand, if the disturbance is large, the SN threshold is set low. However, if the SN threshold is low (that is, lower than in the above-described high threshold), the counter threshold is set to a high value (that is, 5, for example, which is higher than the above-described low threshold).

The counter threshold is set in this manner because if the SN ratio is low, for example, it is considered that the detection accuracy of the radar devices 5 is not stable, and thus the period of situation determination is set to be higher than usual.

<Case of Cancellation Condition 2>

If the other vehicle 3B is not traveling in the third lane and TTC is 3 seconds or less, it is determined that the monitoring cancellation condition is satisfied. The TTC here refers to the time to collision between the other vehicle 3B and the own vehicle 3A if the own vehicle 3A has moved to the second lane and the state of the current relative speed and the like continues. The TTC can be obtained by dividing the inter-vehicle distance by the relative speed. TTC is an abbreviate of Time to Collision.

That is, if the other vehicle 3B is not traveling in the third lane and there is a possibility of a collision in a short time, the monitoring of the other vehicle 3B is cancelled.

<Case of Cancellation Condition 3>

If the third lane does not exist, it is determined that the monitoring cancellation condition is satisfied.

The third lane does not exist in the case where the own vehicle 3A has moved to the second lane, for example.

<Case of Cancellation Condition 4>

If the past alarm flag of the target (that is, the other vehicle 3B) is on and the past monitoring flag of the target is off, it is determined that the monitoring cancellation condition is satisfied.

The ON state of the past alarm flag means that the current monitoring target was an alarm target in a preceding process (for example, the previous process or the process before last). The alarm flag is a flag that is set if the condition for issuing an alarm is satisfied.

Since the monitoring cancellation condition is satisfied in step S350, the vehicle control device 9 turns off the monitoring flag.

If the other vehicle 3B is traveling in the own lane or the other vehicle 3B is traveling in the second lane from the beginning, the other vehicle 3B is not regarded as the other vehicle 3B that is the current alarm target, that is, is not regarded as the other vehicle 3B that has moved from the third lane to the second lane. Such the other vehicle 3B is not excluded from the monitoring target from the beginning.

In subsequent step S360, the vehicle control device 9 determines whether the alarm determination condition is satisfied, that is, whether the monitoring flag is off. If the vehicle control device 9 makes an affirmative determination, the process proceeds to step S370. On the other hand, if the vehicle control device 9 makes a negative determination, the process is temporarily ended.

In step S370, the vehicle control device 9 turns on "alm_final output", that is, sets the alarm flag, and the process is temporarily ended. If the alarm flag is set (that is, turned on) in this manner, the alarm device 7 issues an alarm.

Steps S300 to S370 described above are performed on all target objects (that is, the other vehicles 3B).

1-4. Advantageous Effects

In the first embodiment, the following operations and advantageous effects can be obtained.

(1a) The vehicle control device 9 in the first embodiment can assist the driver in checking the rear side of the own vehicle 3A in order to achieve safety of the own vehicle 3A at the time of a lane change.

The vehicle control device 9 includes the position estimation unit 21, the SN index calculation unit 23, the lane determination unit 25, and the alarm determination unit 27.

According to this configuration, in the first embodiment, it is possible to accurately determine the lane in which the other vehicle 3B is traveling, so that an alarm can be appropriately issued about the other vehicle 3B traveling in a blind spot on the rear side of the own vehicle 3A.

More specifically, if the SN ratio is high, the accuracy of estimation of the lateral position is high, and on the other hand, if the SN ratio is low, the accuracy of estimation of the lateral position is low. Therefore, in the case of determining the traveling lane of the other vehicle 3B, it is possible to further reliably determine the traveling lane of the other vehicle 3B in consideration of the magnitude of the SN ratio.

Therefore, if the accuracy of determination of the traveling lane of the other vehicle 3B is high, it is possible to appropriately (for example, quickly) issue an alarm in accordance with the determination result. On the other hand, if the accuracy of determination of the traveling lane of the other vehicle 3B is low, it is possible to enhance the accuracy of estimation of the traveling lane by adding other conditions (for example, lengthening the determination time), for example, and appropriately issue an alarm in accordance with the determination result.

That is, it is possible to issue an alarm appropriately when it is supposed to be (for example, at an appropriate timing), and suppress unnecessary issuing of an alarm at the time when there is no need to issue an alarm.

(1*b*) If the SN ratio is higher than a predetermined SN threshold, the vehicle control device 9 in the first embodiment determines the lane in which the other vehicle 3B is traveling, based on a certain determination condition (that is, the first determination condition). If the SN ratio is equal to or lower than the predetermined SN threshold, the vehicle control device 9 determines the lane in which the other vehicle 3B is traveling based on a second determination condition in which other conditions (for example, lengthened determination time or other conditions) to the first determination condition. This allows high-accuracy lane determination to be stably performed. That is, even if the SN ratio varies, it is possible to secure the determination accuracy.

(1*c*) The vehicle control device 9 in the first embodiment can determine whether the other vehicle 3B is traveling in the second lane in accordance with the magnitude of the SN ratio.

(1*d*) After determining that the other vehicle 3B is traveling in the third lane, in the case of determining the lane in which the other vehicle 3B is traveling, the vehicle control device 9 in the first embodiment can decrease the counter threshold as the SN ratio is higher, for example, so that it is likely to determine that the other vehicle 3B is traveling in the second lane. This allows high-accuracy lane determination to be stably performed.

(1*e*) The vehicle control device 9 in the first embodiment can update the counter value of the traveling counter set for determining the lane in which the other vehicle 3B is traveling, based on the SN threshold.

(1*f*) The vehicle control device 9 in the first embodiment can make the counter value of the traveling counter likely to be increased as the SN ratio is higher. Accordingly, as the reliability of the reflected wave is higher, it is possible to quickly perform the lane determination, and it is possible to quickly issue an alarm as necessary.

(1*g*) If it is estimated that the other vehicle 3B is traveling in the third lane based on a determination criteria for determining whether the other vehicle 3B is traveling in the third lane, the vehicle control device 9 in the first embodiment can turn on the monitoring flag for specifying the other vehicle 3B that is a monitoring target.

(1*h*) If it is determined that the other vehicle 3B has moved to the second lane based on a determination criteria for determining whether the other vehicle 3B has moved from the third lane to the second lane, the vehicle control device 9 in the first embodiment can turn off the monitoring flag. If there is a risk of a collision between the own vehicle 3A and the other vehicle 3B of which the monitoring flag is turned off, it is possible to issue an alarm.

(1*i*) If it is estimated that the third lane does not exist, the vehicle control device 9 in the first embodiment can turn off the monitoring flag.

(1*j*) If it is estimated that the other vehicle 3B has moved to the second lane based on the determination condition that the other vehicle 3B is not traveling in the third lane and the determination condition in accordance with the SN threshold, the vehicle control device 9 in the first embodiment can turn off the monitoring flag.

1-5. Correspondence of Wording

In the relation between the first embodiment and the present disclosure, the own vehicle 3A corresponds to the own vehicle, the other vehicle 3B corresponds to the other vehicle, the vehicle control device 9 corresponds to the vehicle control device, the position estimation unit 21 corresponds to the position estimation unit, the SN index calculation unit 23 corresponds to the SN index calculation unit, the lane determination unit 25 corresponds to the lane determination unit, and the alarm determination unit 27 corresponds to the alarm determination unit.

2. Second Embodiment

A second embodiment is similar in basic configuration to the first embodiment, and thus the differences from the first embodiment will be mainly described below. The same reference signs in the second embodiment as those in the first embodiment indicate identical components and the foregoing description will be referred to.

In the second embodiment, an SN threshold is changed depending on the difference in lateral position between a target (that is, another vehicle 3B) and a wall, and this point will be mainly described.

2-1. Outline of Control

First, the outline of a control in the second embodiment will be described.

Figure 10:
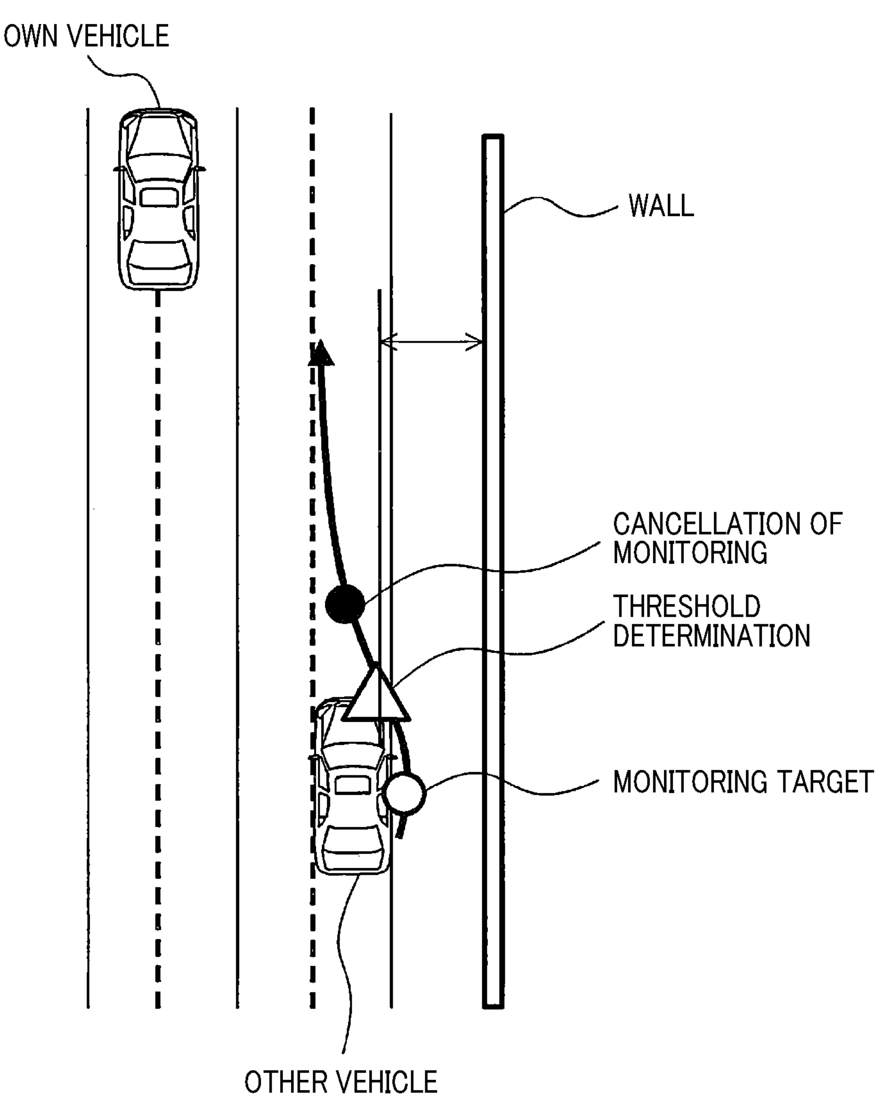
FIG. 10 is an explanatory diagram describing a process in the case where there is a wall near the other vehicle traveling on the outer side of the second lane.

As illustrated in FIG. 10, if there is a wall on the outer side of a second lane (that is, the side further from an own vehicle 3A), it may be erroneously determined that the other vehicle 3B is traveling in the third lane even though the other vehicle 3B is actually traveling on the outer side of the second lane, under the influence of the wall.

That is, the traveling position of the other vehicle 3B may be erroneously determined due to fluctuation (that is, disturbance) of reflected waves generated by the presence of the wall.

Thus, at the timing when it is determined that the traveling position of the other vehicle 3B has moved to the second lane, the distance from the other vehicle 3B to the wall is determined based on the lateral position of the other vehicle 3B and the lateral position of the wall. Then, if the distance is shorter than a predetermined determination value (that is, the wall is close), the SN threshold is adjusted.

Specifically, if the distance from the other vehicle 3B to the wall is short (that is, the other vehicle 3B is close to the wall), the SN threshold is decreased. For example, the SN threshold is decreased by a predetermined dB from the previously set value. For example, if the SN threshold was previously set to 45 dB, the SN threshold is decreased to 40 dB.

More specifically, if the other vehicle 3B is close to the wall, the disturbance is large and thus the difference between the level of the disturbance (that is, noise) and the level of the signal becomes small and the traveling counter is unlikely to be incremented. Thus, the SN threshold is decreased, but the counter threshold is increased because the disturbance is large and the angular accuracy is low.

The reason why the counter threshold is increased here is that the SN threshold is decreased with a low angular accuracy to make it likely to increment the counter, and thus the determination accuracy needs to be enhanced as much as possible by lengthening the determination time.

If the other vehicle 3B is close to the wall but the SN ratio is higher than a predetermined value, for example, the SN threshold S3 (for example, 35 dB), the other vehicle 3B is determined as stable in angle and thus the SN threshold is not changed.

As described above, if it is determined that the other vehicle 3B is traveling in the second lane, the monitoring is cancelled.

Figure 11:
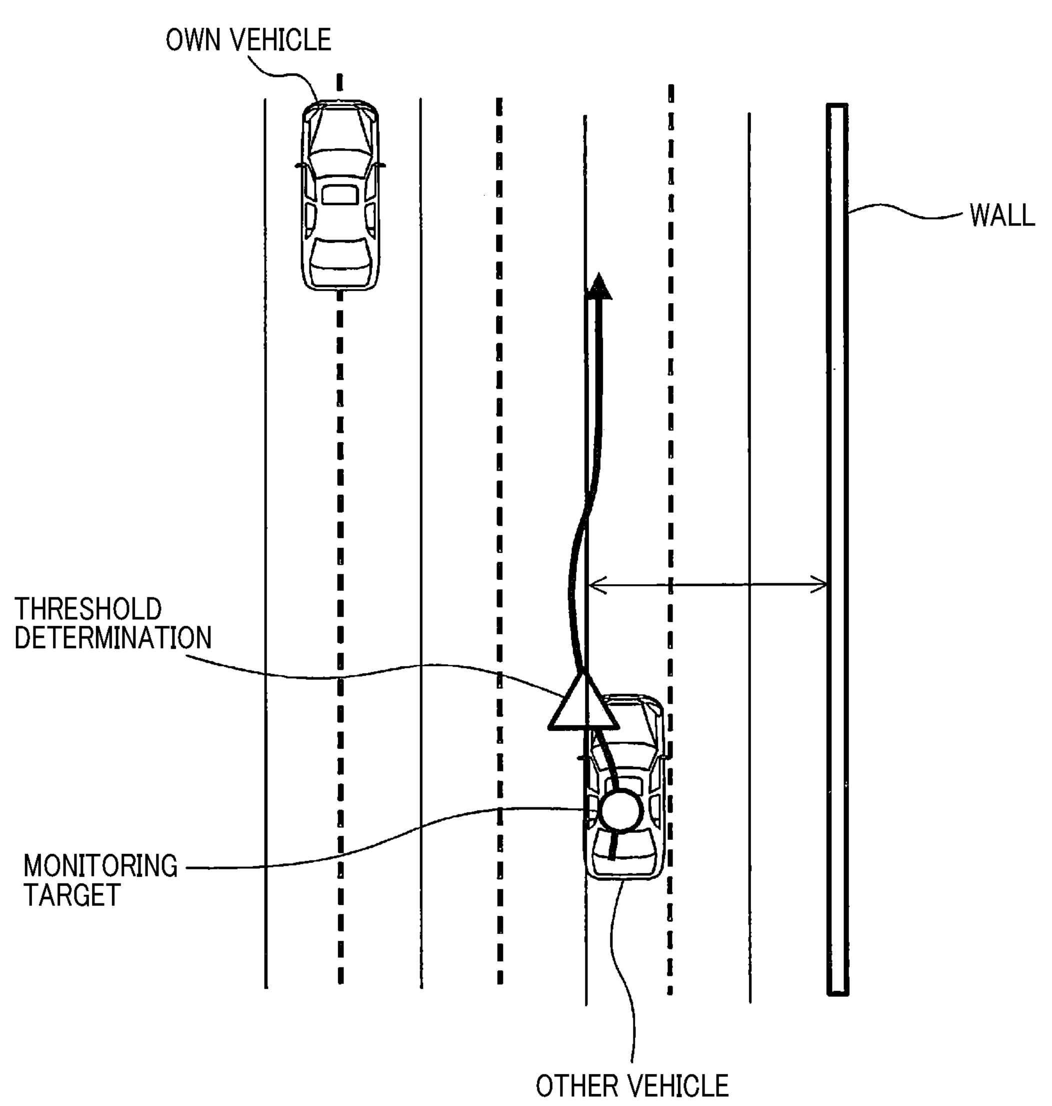
FIG. 11 is an explanatory diagram describing a process in the case where there is a wall distant from the other vehicle traveling on the inner side of the third lane.

FIG. 11 illustrates an example in which there is a wall outside the third lane. The same process applies to the case in which there is no wall.

If it is determined that the other vehicle 3B has moved to the second lane after traveling on the inner side of the third lane, the distance from the other vehicle 3B to the wall is determined at that time, based on the lateral position of the other vehicle 3B and the lateral position of the wall. Then, if the distance is equal to or longer than a predetermined determination value (that is, the wall is distant), the SN threshold is adjusted.

Specifically, if the other vehicle 3B is far from the wall, the SN threshold is increased. For example, the SN threshold is increased by a predetermined dB from the previously set value.

More specifically, if the other vehicle 3B is far from the wall, the disturbance is small and the difference between the level of the disturbance (that is, noise) and the level of the signal becomes large, and the traveling counter is likely to be incremented. Thus, the SN threshold is increased, but the counter threshold is decreased because the disturbance is small and the angular accuracy is high.

The reason why the counter threshold is decreased is that, since the condition of the SN threshold is satisfied in the state in which the SN threshold is increased (that is, the reliability of the data is high), it is desired to shorten the determination time and move to the alarm target early.

Even if the other vehicle 3B is far from the wall, if the SN ratio is equal to or less than a predetermined value (for example, S3), it is determined that the other vehicle 3B is a vehicle at an instable angle, and the SN threshold is decreased so as to be lower than before the change.

2-2. Process of Control

Next, a process of control in the second embodiment will be described with reference to FIG. 12 and Table 4.

This process is a process of changing the SN threshold to be used in step S330 of FIG. 8 in accordance with the distance from the other vehicle 3B to the wall, thereby to adjust the traveling counter.

As illustrated in the flowchart of FIG. 12, in step S400, the vehicle control device 9 determines whether a threshold change condition for changing the SN threshold is satisfied. For example, the vehicle control device 9 determines whether the condition that the other vehicle 3B is not traveling in the third lane is satisfied. If the vehicle control device 9 makes an affirmative determination, the process proceeds to step S410. On the other hand, if the vehicle control device 9 makes a negative determination, the process is temporarily ended.

In step S410, the vehicle control device 9 calculates the distance from the other vehicle 3B to the wall.

In subsequent step S420, the vehicle control device 9 performs a determination on a wall distance condition A. That is, the vehicle control device 9 determines whether the distance from the other vehicle 3B to the wall (that is, wall distance) is less than 7 m or equal to or greater than 7 m. If the vehicle control device 9 determines that the distance is less than 7 m, the process proceeds to step S480. On the other hand, if the vehicle control device 9 determines that the distance is equal to or greater than 7 m, the process proceeds to step S430.

In step S430, the vehicle control device 9 makes a determination on an SN ratio condition C. That is, the vehicle control device 9 determines whether the SN ratio is greater than 35 dB or equal to or less than 35 dB. If the vehicle control device 9 determines that the SN ratio is greater than 35 dB, the process proceeds to step S460. On the other hand, if the vehicle control device 9 determines that the SN ratio is equal to or less than 35 dB, the process proceeds to step S440.

In step S440, the vehicle control device 9 decreases the SN threshold.

In subsequent step S450, the vehicle control device 9 sets the counter threshold to 4, and the process is temporarily ended.

On the other hand, in step S460, the vehicle control device 9 increases the SN threshold.

In subsequent step S470, the vehicle control device 9 sets the counter threshold to 2 and the process is temporarily ended.

In step S480 to which the process proceeds if the vehicle control device 9 determines that the wall distance is less than 7 m in step S420, the vehicle control device 9 makes a determination on a wall distance condition B. That is, the vehicle control device 9 determines whether the wall distance is greater than 3.5 m or equal to or less than 3.5 m. If the vehicle control device 9 determines that the distance is greater than 3.5 m, the process proceeds to step S510. On the other hand, if the vehicle control device 9 determines that the distance is equal to or less than 3.5 m, the process proceeds to step S490.

In step S490, the vehicle control device 9 decreases the SN threshold.

In step S500, the vehicle control device 9 sets the counter threshold to 4, and the process is temporarily ended.

On the other hand, in step S510, the vehicle control device 9 makes a determination on an SN ratio condition D. That is, the vehicle control device 9 determines whether the SN ratio is greater than 35 dB or equal to or less than 35 dB. If the vehicle control device 9 determines that the SN ratio is greater than 35 dB, the process proceeds to step S540. On the other hand, if the vehicle control device 9 determines that the SN ratio is equal to or less than 35 dB, the process proceeds to step S520.

In step S520, the vehicle control device 9 decreases the SN threshold.

In subsequent step S530, the vehicle control device 9 sets the counter threshold to 4, and the process is temporarily ended.

On the other hand, in step S540, the vehicle control device 9 sets the counter threshold to 2, and the process is temporarily ended.

Methods for setting the SN threshold and the counter threshold will be described with reference to Table 4 below.

TABLE 4

| Wall distance condition | SN ratio threshold condition | SN threshold | Counter threshold |
|---|---|---|---|
| 7 m or greater than 7 m | 35 dB or less than 35 dB | Decrease threshold | 4 |
| | Other than those above | Increase threshold | 2 |
| 3.5 m or less than 3.5 m | — | Decrease threshold | 4 |
| Other than those above | Greater than 35 dB | No operation | 2 |
| | Other than those above | Decrease threshold | 4 |

Even if the influence of the disturbance is small with a wall distance of 7 m or greater than 7 m, if the SN ratio is equal to or less than 35 dB, it is considered that the difference between the level of the noise and the level of the signal is small. In this case, the traveling counter is unlikely to be incremented, and thus the SN threshold is decreased but the counter threshold is increased to 4, for example, because the angular accuracy is low.

Even if the influence of the disturbance is small with a wall distance of 7 m or more, if the SN ratio is greater than 35 dB, it is determined that the difference between the level of the noise and the level of the signal is large. In this case, since the traveling counter is likely to be incremented, the SN threshold is increased and the counter threshold is decreased to 2, for example.

If the influence of the disturbance is large with a wall distance of 3.5 m or less, the SN threshold is decreased and the counter threshold is increased to 4, for example.

If the wall distance is less than 7 m and greater than 3.5 m, it is considered that the influence of the disturbance is medium. In this case, if the SN ratio is greater than 35 dB, the SN threshold is not changed. At this time, the counter threshold is kept at 2, for example.

If the wall distance is less than 7 m and greater than 3.5 m, it is considered that the influence of the disturbance is medium. In this case, if the SN ratio is equal to or less than 35 dB, it is considered that the difference between the level of the noise and the level of the signal is small. In this case, since the traveling counter is unlikely to be incremented, the SN threshold is decreased but the counter threshold is increased to 4, for example, because the angular accuracy is low.

The adjusted SN threshold may be kept until the target is lost, the monitoring is cancelled, or the TTC becomes 3 seconds or less, for example. Alternatively, the SN threshold may be made variable every time calculation is performed in each cycle.

2-3. Advantageous Effects (2*a*) The second embodiment produces advantageous effects similar to those of the first embodiment.

(2*b*) In the second embodiment, the SN threshold is changed in accordance with the SN ratio in order to suppress (for example, eliminate) the influence of the disturbance due to the reflected waves of radar waves.

That is, the SN threshold is changed in accordance with the difference in lateral position between the other vehicle 3B and the wall (that is, the distance from the other vehicle 3B to the wall). Specifically, if the difference in lateral position between the other vehicle 3B and the wall is small, the SN threshold is made smaller than that in the case where the difference is large.

Accordingly, it is possible to reduce the influence of fluctuation of the reflected waves caused by the difference in lateral position. Therefore, the traveling lane can be determined with stable accuracy regardless of the state of the disturbance.

More specifically, in the above-described process, it can be determined that the other vehicle 3B is traveling in the second lane with the same accuracy regardless of the magnitude of the disturbance. As a result, it is possible to issue an alarm at an appropriate timing.

3. Other Embodiments

Embodiments of the present disclosure have been described above. However, the present disclosure is not limited to the above-described embodiments and can be carried out in various modifications.

(3*a*) In the present disclosure, as the SN index, the ratio of the level of the target signal (that is, S) to the level of the noise (that is, N) is used. Alternatively, the difference between the level of the signal and the level of the noise (that is, S−N) may be used. That is, as the SN index, various indexes indicating the relationship between the level of the noise and the level of the signal can be employed.

(3*b*) As in the first embodiment, the SN threshold may be changed in accordance with various disturbances other than a wall (for example, natural environment). Further, the SN threshold may be changed in accordance with the TTC. For example, if the TTC is 5 seconds or greater than 5 seconds, the SN threshold may be made higher.

(3*c*) The vehicle control device and method described in the present disclosure may be implemented by a dedicated computer that is provided by including a processor programmed to execute one or more functions embodied by a computer program, and a memory.

Alternatively, the vehicle control device and method described in the present disclosure may be implemented by a dedicated computer that is provided by configuring a processor with one or more dedicated hardware logic circuits.

Alternatively, the vehicle control device and method described in the present disclosure may be implemented by one or more dedicated computers that are configured by combining a processor programmed to execute one or more functions and a memory with a processor configured by one or more hardware logic circuits.

The computer program may be stored in a computer-readable non-transitory tangible storage medium, as instructions to be executed by a computer. A method for performing the functions of components included in the control unit is not necessarily required to include software, and all the functions may be performed by one or more hardware units.

(3*d*) In the above-described embodiments, a plurality of functions of one constituent element may be performed by a plurality of constituent elements, or one function of one constituent element may be performed by a plurality of constituent elements. A plurality of functions of a plurality of constituent elements may be performed by one constituent element, or one function to be performed by a plurality of constituent elements may be performed by one constituent element. Some of components in the above-described embodiments may be omitted. At least some of the components of one of the above-described embodiments may be added to or replaced with the components of the other above-described embodiment.

(3*e*) The present disclosure can be carried out in various modes such as the above-described vehicle control device, a system having the vehicle control device as a constituent element, a program for causing a computer of the vehicle control device to function, a non-transitory tangible storage medium such as a semiconductor memory storing this program, and a control method.

What is claimed is:

1. A vehicle control device that assists blind spot monitoring of an own vehicle, the own vehicle equipped with a radar sensor that is configured to transmit a radar wave toward an object and receive a reflected wave that is reflected from the object, the vehicle control device comprising:

a position estimation unit configured to estimate a lateral position of an other vehicle indicating a position in a width direction of a road, wherein the lateral position is estimated based on a reflected wave of the radar wave that is emitted from the radar sensor of the own vehicle;

an SN index calculation unit configured to, based on the reflected wave of the radar wave emitted from the own vehicle to the surroundings, calculate an SN index indicating a relationship between level of a signal and level of a noise in the reflected wave;

a lane determination unit configured to, in response to determining a lane in which the other vehicle is traveling based on information on the lateral position of the other vehicle estimated by the position estimation unit, perform a determination on the lane in which the other vehicle is traveling based on the SN index calculated by the SN index calculation unit; and an alarm determination unit configured to, based on a result of determination by the lane determination unit, determine whether a condition for issuing an alarm about the other vehicle is satisfied.

2. The vehicle control device according to claim 1, wherein the vehicle control device is configured to, in response to the SN index being higher than a predetermined value, perform a determination on the lane in which the other vehicle is traveling based on a first determination condition, and in response to the SN index being equal to or less than the predetermined value, perform a determination on the lane in which the other vehicle is traveling based on a second determination condition in which another condition is added to the first determination condition.

3. The vehicle control device according to claim 1, wherein the vehicle control device is configured to determine whether the other vehicle is traveling in a second lane adjacent to a first lane in which the own vehicle is traveling, based on magnitude of the SN index.

4. The vehicle control device according to claim 1, wherein in response to the lane in which the own vehicle is traveling serving as a first lane, the lane adjacent to the first lane serving as a second lane, and the lane adjacent to the second lane and opposite to the first lane serving as a third lane, the vehicle control device is configured to, after it is determined that the other vehicle is traveling in the third lane, in response to determining the lane in which the other vehicle is traveling, make it more likely that it is determined that the other vehicle is traveling in the second lane as the SN index is higher.

5. The vehicle control device according to claim 1, wherein the vehicle control device is configured to, set an SN threshold for determining the magnitude of the SN index, and update a counter value of the traveling counter set for determining the lane in which the other vehicle is traveling based on the SN threshold.

6. The vehicle control device according to claim 5, wherein the vehicle control device is configured to make it more likely that the counter value of the traveling counter is incremented as the SN index is higher.

7. The vehicle control device according to claim 1, wherein in response to the lane in which the own vehicle is traveling serving as a first lane, the lane adjacent to the first lane serving as a second lane, and the lane adjacent to the second lane and opposite to the first lane serving as the third lane, the vehicle control device is configured to, in response to estimating that the other vehicle is traveling in the third lane based on a determination criterion on which to determine whether the other vehicle is traveling in the third lane, turn on a monitoring flag for specifying the other vehicle that is a monitoring target.

8. The vehicle control device according to claim 7, wherein the vehicle control device is configured to, in response to determining that the other vehicle has moved to the second lane based on a determination criterion on which to determine whether the other vehicle has moved from the third lane to the second lane, turn off the monitoring flag.

9. The vehicle control device according to claim 7, wherein the vehicle control device is configured to, in response to estimating that the third lane does not exist, turn off the monitoring flag.

10. The vehicle control device according to claim 7, wherein the vehicle control device is configured to set a SN threshold for determining the magnitude of the SN index, and in response to estimating that the other vehicle has moved to the second lane based on a condition that the other vehicle is not traveling in the third lane and a determination condition based on the SN threshold, turn off the monitoring flag.

11. The vehicle control device according to claim 1, wherein the vehicle control device is configured to set a SN threshold for determining the magnitude of the SN index, and change the SN threshold in accordance with the SN index in order to suppress influence of a disturbance in the reflected wave of the radar wave.

12. The vehicle control device according to claim 11, wherein the vehicle control device is configured to change the SN threshold in accordance with a difference in lateral position between the other vehicle and a wall.

13. The vehicle control device according to claim 12, wherein the vehicle control device is configured to, in response to the difference in lateral position between the other vehicle and the wall being less than a determination value, make the SN threshold less than the SN threshold in a case where the difference in lateral position between the other vehicle and the wall is larger than the determination value.

14. The vehicle control device according to claim 2, wherein the vehicle control device is configured to determine whether the other vehicle is traveling in a second lane adjacent to a first lane in which the own vehicle is traveling, based on magnitude of the SN index.

* * * * *